United States Patent
Berg et al.

(10) Patent No.: US 11,472,036 B2
(45) Date of Patent: Oct. 18, 2022

(54) REDUCING MOTION BLUR FOR ROBOT-MOUNTED CAMERAS

(71) Applicant: Intrinsic Innovation LLC, Mountain View, CA (US)

(72) Inventors: Nils Berg, Karlsruhe (DE); Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 371 days.

(21) Appl. No.: 16/724,883

(22) Filed: Dec. 23, 2019

(65) Prior Publication Data
US 2021/0187747 A1    Jun. 24, 2021

(51) Int. Cl.
| | | |
|---|---|---|
| *B25J 9/16* | (2006.01) | |
| *B25J 9/00* | (2006.01) | |
| *G06T 5/00* | (2006.01) | |
| *B25J 9/02* | (2006.01) | |
| *B25J 19/02* | (2006.01) | |
| *G06T 7/262* | (2017.01) | |

(52) U.S. Cl.
CPC ........... *B25J 9/1697* (2013.01); *B25J 9/023* (2013.01); *B25J 19/023* (2013.01); *G06T 5/003* (2013.01); *G06T 7/262* (2017.01)

(58) Field of Classification Search
CPC ............... B25J 9/16; B25J 9/023; G06T 5/00
See application file for complete search history.

(56) References Cited

U.S. PATENT DOCUMENTS

| | | | | |
|---|---|---|---|---|
| 2006/0125938 | A1* | 6/2006 | Ben-Ezra | G06T 5/003 348/241 |
| 2009/0270678 | A1* | 10/2009 | Scott | A61B 90/361 600/109 |
| 2010/0119146 | A1* | 5/2010 | Inazumi | G06T 5/003 901/1 |
| 2015/0042829 | A1* | 2/2015 | McCloskey | H04N 5/23258 348/208.5 |
| 2017/0154431 | A1* | 6/2017 | Kim | G06T 5/003 |
| 2019/0164285 | A1* | 5/2019 | Nye | G06T 7/70 |
| 2019/0189083 | A1* | 6/2019 | Lee | G09G 3/20 |

OTHER PUBLICATIONS

Dansereau et al "Motion Deblurring for light fields"; Jun. 2016' 10 pages.*

(Continued)

*Primary Examiner* — Kira Nguyen
(74) *Attorney, Agent, or Firm* — Fish & Richardson P.C.

(57) ABSTRACT

Methods, systems, and apparatus, including computer programs encoded on computer storage media, for deblurring an image captured by a robot-mounted camera. One of the methods comprises capturing, using a camera that is attached to an arm of a robot, an image at a first time, wherein the image exhibits motion blur, and wherein the exhibited blur was caused by movement of the arm of the robot at the first time; receiving, from a robot control system of the robot, motion data characterizing the movement of the arm of the robot at the first time; generating a motion kernel using the received motion data; and generating a deblurred image by processing the image using the motion kernel.

20 Claims, 3 Drawing Sheets

(56) References Cited

OTHER PUBLICATIONS

Joshi et al, "Image deblurring using inertial measurement sensors," ACM SIGGRAPH Conference Proceeding, 2010, 8 pages.
Park et al, "Motion deblurring using coded exposure for a wheeled mobile robot," IEEE Xplore, Nov. 2014, 7 pages.
theblog.adobe.com [online], "Behind all the buzz: deblur sneak peek," Oct. 16, 2011, [retreived on Dec. 18, 2019], retreived from URL<https://theblog.adobe.com/behind-all-the-buzz-deblur-sneak-peek/>, 7 pages.

* cited by examiner

Example Blurry Image 210

Example Deblurred Image 230

Example Motion Kernel 220

REDUCING MOTION BLUR FOR ROBOT-MOUNTED CAMERAS

BACKGROUND

This specification relates to robotics, and more particularly to planning robotic movements.

Robotics planning refers to sequencing the physical movements of robots in order to perform tasks. For example, an industrial robot that builds cars can be programmed to first pick up a car part and then weld a car part onto the frame of the car. Each of these actions can themselves include dozens or hundreds of individual movements by robot motors and actuators.

In this specification, a workcell is the physical environment in which a robot will operate. Workcells have particular physical properties, e.g., physical dimensions, that impose constraints on how robots can move within the workcell. Workcells often contain more than one robot. For example, a workcell can have multiple robots each welding a different car part onto the frame of a car at the same time. In these cases, the planning process can include assigning tasks to specific robots and planning all the movements of each of the robots.

In many industrial robotics applications, the primary success or failure criteria for a plan is the time it takes to complete a task. For example, real-time images of the workcell are often required to complete the task. When the images are captured by a camera attached to a robotic arm, often the robotic arm must be completely still when an image is captured, so that the image does not exhibit motion blur. Bringing the robotic arm to a complete stop between movements takes time, affecting the overall throughput of the factory.

SUMMARY

This specification generally describes how a system can process a blurry image captured by a robot-mounted camera using motion data of the robot to generate a deblurred image.

The camera can be attached to an arm of a robot. The robot's motion can be controlled by a robotic control system. The robotic control system also shares a synchronized source of time with the camera in order to determine the precise pose, speed, and/or acceleration of the robotic arm when an image is captured by the camera. If the camera is not stationary when the image is captured, then the image can exhibit motion blur. In this specification, "motion blur" refers to blurring artifacts in an image caused by movement of the camera at the time of capturing the image.

The blurry image, as well as the motion data logged by the robotic control system, can be sent to a deblurring system in order to deblur the image. The deblurring system can generate, using the motion data, a motion kernel of the image. The deblurring system can then deblur the image by deconvolving the image using the generated motion kernel.

Particular embodiments of the subject matter described in this specification can be implemented so as to realize one or more of the following advantages.

Using techniques described in this specification can dramatically reduce the amount of time required to capture a high-quality image using a camera attached to a robotic arm in a workcell. In order to avoid motion blur when capturing an image, the robotic arm would have to come to a complete stop before the camera captures the image, and would not be able to move again until the image has been captured. Some embodiments described in this specification allow a robotic control system to provide motion data to a deblurring system in order to reliably and accurately deblur an image. Therefore, the robotic control system can execute a plan that allows the robotic arm to move within the workcell while the camera captures the image. If one or more images captured by the camera are required for the robotic control system to continue with the plan, e.g., if the images are processed to determine a quality of the product produced in the workcell or to ensure the safety of the workcell, then allowing the robotic arm to move while the camera is capturing the images can speed up the execution of the plan of the robotic control system. This can increase the throughput of the workcell.

In some existing systems, the allowable exposure time of a camera is limited because a longer exposure time can cause the image to exhibit more motion blur. In some embodiments described in this specification, a deblurring system can reliably and accurately deblur images that had long exposures, e.g., 100s of milliseconds. This can be helpful in situations where the workcell is poorly lit, because longer exposure can be necessary to capture low-light images.

In some embodiments described in this specification, a deblurring system can pre-compute some or all of the motion kernel of an image before the image is even captured by a robot-mounted camera, using motion data derived from a plan to be executed by a robotic control system of the robot. This can greatly speed up the deblurring process, as the computation time devoted to computing the motion kernel, which can be a significant proportion of the overall computation time, can be frontloaded. For real-time robotic applications, saving time during execution by pre-computing the motion kernel can help a robotic control system satisfy real-time constraints. This can provide an advantage to existing systems that leverage motion data captured by a motion sensor attached to the robotic arm, as opposed to motion data that is directly computed from the robotic control system of the robotic arm, because the motion data captured by the motion sensor cannot be precomputed.

The motion data computed from the robotic control system can also be more accurate than motion data captured by a motion sensor. For example, some robotic control systems can control a robotic arm with a repeatability of <0.1 mm; that is, the robotic arm is able to repeat a particular action within a margin of error of 0.1 mm. Motion data computed with this accuracy is better than many state-of-the-art motion sensors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
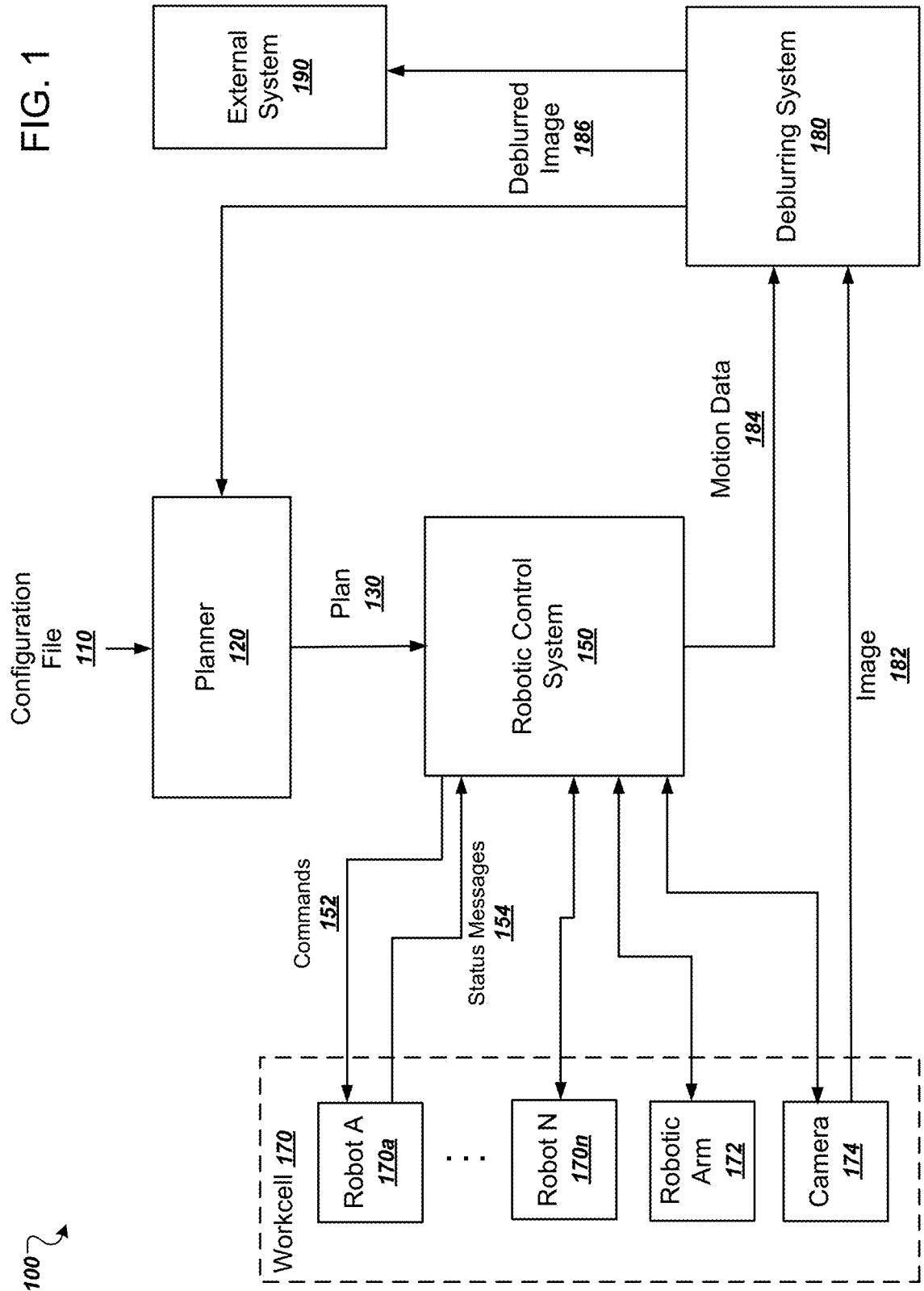
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120, a robotic control system 150, and a deblurring system 180. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n and a camera 174.

The robotic control system 150 is configured to control the robots 170a-n in the workcell 170. The camera 174 can be mounted to a robotic arm 172 of one of the robots 170a-n. The camera 174 is configured to capture images of the workcell 170.

The overall goal of the planner 120 is to generate a plan that allows the robotic control system 150 to execute one or more tasks, while ensuring that the camera 174 is able to capture certain desired images of the workcell 170.

The planner 120 receives a configuration file 110. The configuration file 110 can be generated by a user. The configuration file 110 can specify one or more tasks to be completed by the robots in the workcell 170. The configuration file 110 can also specify the desired images to be captured by the camera 174. For example, the configuration file 110 can specify that an image of the first robot 170a in the workcell 170 must be captured from a particular perspective at a particular time. That is, the robotic arm 172 must move the camera 174 to a location in the workcell 170 from which the camera 174 can capture the desired image from the particular perspective at the particular time. As another example, the configuration file 110 can specify that an image of the first robot 170a in the workcell 170 must be captured from any perspective at any time during the execution of the one or more tasks.

The planner 120 uses the configuration file 110 to generate a plan 130 for the robotic control system 150 that, when executed by the robots in the workcell 170, accomplishes the tasks specified in the configuration file 110 while capturing the desired images of the workcell 170 specified in the configuration file 110.

The planner 120 gives the plan 130 to the robotic control system 150. In some implementations, the planner 120 is an offline planner. That is, the planner 120 can provide the plan 130 to the robotic control system 150 before the robotic control system 150 executes any operations, and the planner 120 does not receive any direct feedback from the robotic control system 150. In some such implementations, the planner 120 can be hosted offsite at a data center separate from the robotic control system 150.

In some other implementations, the planner 120 can be an online planner. That is, the robotic control system can receive the plan 130 and begin execution, and provide feedback on the execution to the planner 120. The planner 120 can respond to feedback from the robotic control system 150, and generate a new plan in response to the feedback.

The robotic control system 150 executes the plan 130 by issuing commands 152 to the workcell 170 in order to drive the movements of the robots 170a-n. As the robots 170a-n execute the operations identified in the commands 152, the robots 170a-n can send response messages 154 back to the robotic control system 150. A response message sent by a robot in the workcell 170 can include information about the current state of the robot, e.g., a current pose, velocity, and/or acceleration of the robot.

The robotic control system 150 can also issue commands 152 to the robotic arm 172 and to the sensor 174. For example, the commands 152 can drive the robotic arm 172 to move to particular locations in the workcell 170 at particular times identified in the plan 130, and can drive the camera 174 to capture certain desired images of the workcell 170. In some cases, the commands 152 can drive the camera 174 to capture an image while the robotic arm 172 is moving, causing the captured image to exhibit motion blur.

The camera 174 and the robotic control system 150 share a synchronized source of time; that is, the robotic control system 150 can determine a precise time at which the camera 174 captured a particular image, and can determine, using received status messages 184, the state of the robotic control system 150 at the precise time, where the state includes information about the motion of the robotic arm 172. In some implementations, the robotic control system 150 initiates the synchronization; that is, the camera 174 subscribes to a source of time published by the robotic control system 150. In some other implementations, the camera 174 and the robotic control system 150 both subscribe to the same external source of time.

The camera 174 can send an image 182 to the deblurring system 180. The image 182 can exhibit motion blur caused by movement of the robotic arm 172 at the time that the camera 174 captured the image 182.

The robotic control system 150 can send motion data 184 to the deblurring system 180. The motion data 184 characterizes the movement of the robotic arm 172 at the time that the camera 174 captured the image 182. For example, the motion data 184 can include a pose, velocity, and acceleration of the robotic arm 172 at the time that the camera 174 captured the image 182. The robotic control system 150 can generate the motion data 184 using status messages 154 received from the robotic arm 172.

As a particular example, the robotic arm 172 can send a status message 154 that includes an angle and an angular velocity of each of multiple joints of the robotic arm. That is, the status message can include a position of the robotic arm 172 in the joint coordinate space of the robotic arm 172, where the joint coordinate space of a robot is a representation of the position of the robot expressed in terms of the translational and/or angular displacement of each joint of the robot. The robotic control system 150 can use forward kinematics to translate the position of the robotic arm 172 in the joint coordinate space of the robotic arm 172 to a position of the robotic arm 172 in a real-world Cartesian coordinate space of the workcell 170. Using the real-world position of the robotic arm 172, and known information about the mounted placement of the camera on the robotic arm 172, the robotic control system 150 can determine a trajectory of the camera in the real-world Cartesian coordinate space of the workcell 170. The trajectory can include a position, velocity, and acceleration of the camera in each of six degrees of freedom, e.g., (x, y, z) coordinates and (pitch, yaw, roll) coordinates in the real-world Cartesian coordinate space of the workcell 170.

The deblurring system 180 can use the received motion data 184 to deblur the image 182. In particular, the deblurring system 180 can use the motion data 184 to generate a motion kernel for the image 182 that characterizes the motion of the camera 174 at the time that the image 182 was captured. A motion kernel is a matrix of values that characterizes the effect of motion on the pixels of an image that exhibits motion blur. Motion kernels are described in more detail below in reference to FIG. 2. The deblurring system 180 can use the generated motion kernel to deconvolve the image 182 to generate a deblurred image 186. The deblurring system 180 can then send the deblurred image 186 to another system.

For example, the deblurring system 180 can send the deblurred image 186 to the planner 120. The planner 120 can use the deblurred image 186 to generate a plan for subsequent movements of the robots in the workcell 170. For example, the planner 120 can process the deblurred image 186, e.g., using a neural network, to determine a location of each object in the workcell 170, and generate a new plan for the robots in the workcell 170 to move without colliding with any other object of the workcell 170.

As another example, the deblurring system 180 can send the deblurred image 186 to an external system 190. There are many external systems that might require the deblurred image 186.

As a particular example, the external system 190 can be a user interface device configured to allow a user to monitor the tasks executed by the robots in the workcell 170.

As another particular example, the external system 190 can be a quality control system that determines a quality of the product being produced in the workcell 170. For example, the quality control system can generate a predicted measure of quality of the product by processing the deblurred image 186 using a machine learning model, e.g., a neural network. The machine learning model can be trained to receive an input image and generate a predicted measure quality of the product depicted in the input image. The quality control system can then determine whether the quality of the product is acceptable, and approve or reject the product based on the determination.

As another particular example, the external system 190 can be a photogrammetry system that uses multiple deblurred images 186 of the workcell 170 to generate a three-dimensional image of the workcell 170. For example, the photogrammetry system can extract features from the deblurred images 186 using a machine learning model, e.g., a neural network. The machine learning model can be trained to receive an input image and generating a location in the input image of one or more features. The system can then generate a three-dimensional image of the workcell 170 using the deblurred images and the extracted features.

Figure 2:
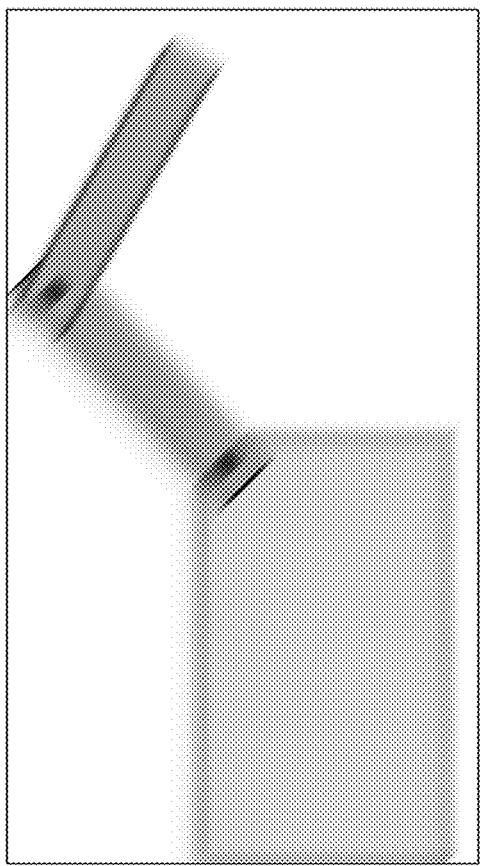
FIG. 2 illustrates an example blurry image, an example motion kernel of the example blurry image, and an example deblurred image.
Figure 2:
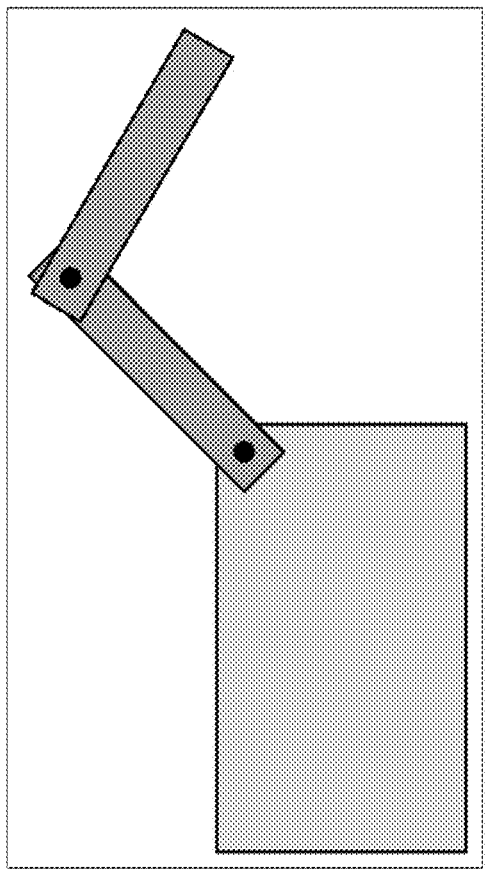
Figure 2:
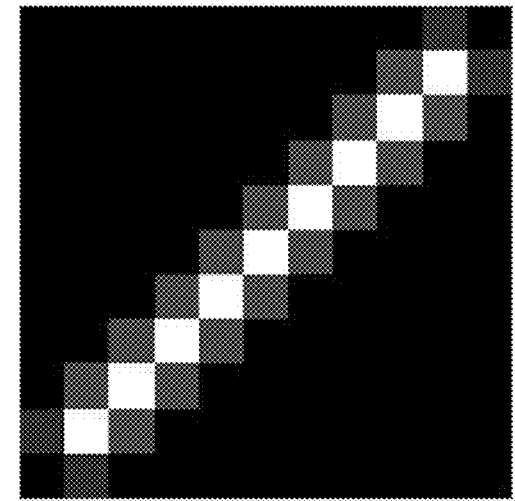

FIG. 2 illustrates an example blurry image 210, an example motion kernel 220 of the example blurry image 210, and an example deblurred image 230.

The deblurred image 230 might have been generated by a deblurring system, e.g., the deblurring system 180 depicted in FIG. 1, by deconvolving the blurry image 210 using an estimated value of the motion kernel 202. The blurry image 210 and the deblurred image 230 depict a robot operating in a workcell. The blurry image 210 might have been captured by a camera mounted on a robotic arm in the workcell.

The motion kernel 220 is a matrix of values that characterizes the effect of the motion of the robotic arm on the pixels of the blurry image 210. The values of the matrix are depicted as grayscale values, where larger values are more white and smaller values are more black. In particular, the motion kernel 220 indicates that the camera was moving down and to the right, relative to the subject of the blurry image 210, at the time that the blurry image 210 was captured.

For each pixel in the blurry image 210, the motion kernel 220 characterizes how the motion of the robotic arm influenced the pixel value. In particular, each pixel value in the blurry image 210 can be represented as a product of the motion kernel 220 convolved with a region of the deblurred image 230 centered around the corresponding pixel in the deblurred image 230.

Deconvolution is a process that can reverse the effects motion blur by representing the blurry image 210 as the product of the convolution of the deblurred image 230 and the motion kernel 220. Represented in this way, the deblurred image 230 can be inferred using the known blurry image 210 and an estimated value of the motion kernel 220.

The motion kernel 220 can be estimated using motion data of the camera provided by a robotic control system that controlled the robotic arm when the image was captured, e.g. the robotic control system 150 depicted in FIG. 1. The motion data can include a pose and velocity of the camera in each of six degrees of freedom, e.g., (x, y, z) coordinates and (pitch, yaw, roll) coordinates in a real-world Cartesian coordinate space. Motion kernels are described in more detail in "Image Deblurring using Inertial Measurement Sensors," Joshi et al., DOI: 10.1145/1833349.1778767, ACM SIGGRAPH 2010.

Figure 3:
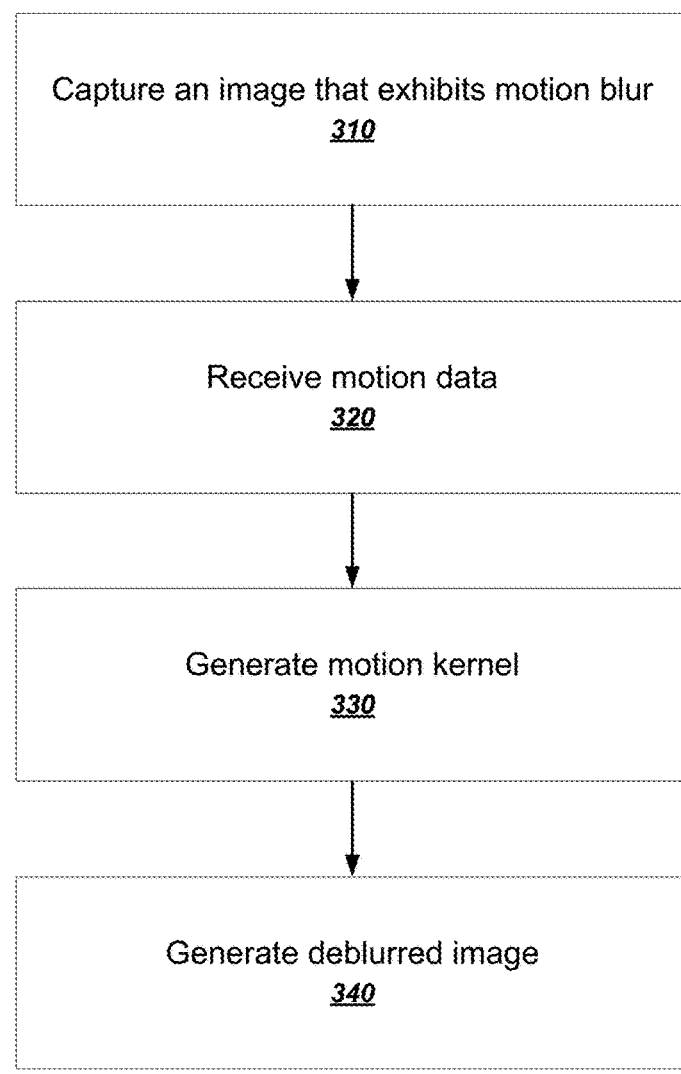
FIG. 3 is a flowchart of an example process for deblurring an image captured by a robot-mounted camera.

FIG. 3 is a flowchart of an example process 300 for deblurring an image captured by a robot-mounted camera. The process 300 can be implemented by one or more computer programs installed on one or more computers and programmed in accordance with this specification. For example, the process 300 can be performed by the deblurring system 180 depicted in FIG. 1. For convenience, the process will be described as being performed by a system of one or more computers.

The system captures an image that exhibits motion blur (step 310). The image is captured at a first time by a camera that is attached to an arm of a robot. The motion blur is caused by movement of the arm of the robot at the first time.

The system receives motion data characterizing the movement of the arm of the robot at the first time (step 320). In some implementations, the motion data includes an angle and an angular velocity for each of multiple degrees of freedom of the arm of the robot, e.g., for each of multiple joints of the arm of the robot.

The system generates a motion kernel using the received motion data (step 330). In some implementations, the motion kernel is generated by translating the motion data into a trajectory of the camera in a Cartesian coordinate space, where the trajectory includes a respective position and velocity for each of multiple degrees of freedom of the camera.

The system generates a deblurred image (step 340). For example, the system can generate an estimated deblurred image by deconvolving the image using the generated motion kernel. As a particular example, the system can compute the Fourier Transform of the image and of the generated motion kernel, and generate the Fourier Transform of the estimated deblurred image by applying deconvolution to the Fourier Transforms of the image and of the generated motion kernel in the Frequency domain. The system can then compute the estimated deblurred image by computing the inverse Fourier Transform of the generated Fourier Transform of the estimated deblurred image.

After the system generates the deblurred image, the system can provide the deblurred image to an external system, e.g., a quality control system or a photogrammetry system.

In some implementations, some or all of steps 320 and 330 can be executed before capturing the image. That is, some or all of the motion kernel can be precomputed using motion data that is derived from a plan for a robotic control system that controls the arm of the robot. Depending on the type of robotic control system, the movement of the arm of the robot can be fully known beforehand, allowing for the full motion kernel to be precomputed. As a particular example, if the robotic control system is an inverse kinematics control system, then the movement of the arm of the robot might be fully determined beforehand. As another particular example, if the robotic control system is an admittance control system, then the movement of the arm of the robot might not be fully determined beforehand. If the motion kernel is precomputed, then upon capturing the image (step 310), the system can generate a deblurred image (step 340) immediately.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels. At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
   capturing, using a camera that is attached to an arm of a robot, an image at a first time, wherein the image exhibits motion blur, and wherein the exhibited blur was caused by movement of the arm of the robot at the first time;
   receiving, from a robot control system of the robot, motion data characterizing the movement of the arm of the robot at the first time;
   generating a motion kernel using the received motion data; and
   generating a deblurred image by processing the image using the motion kernel.

Embodiment 2 is the method of embodiment 1, wherein the motion data comprises a respective angle and angular velocity for each of a plurality of degrees of freedom of the arm of the robot.

Embodiment 3 is the method of any one of embodiments 1 or 2, wherein generating a motion kernel using the received motion data comprises translating the receiving motion data into a trajectory of the camera in a Cartesian coordinate space, wherein:
   the trajectory of the camera comprises a respective position and respective velocity for each of a plurality of degrees of freedom of the camera, and
   the plurality of degrees of freedom of the camera comprises three degrees of freedom for a position of the camera in the Cartesian coordinate system and three degrees of freedom for a rotation of the camera in the Cartesian coordinate system.

Embodiment 4 is the method of any one of embodiments 1-3, wherein:
   receiving motion data characterizing the movement of the arm of the robot at a first time comprises receiving a plan for the robot at a second time that is before the first time, wherein the plan comprises a plan for the movement of the arm of the robot at the first time; and
   generating a motion kernel using the received motion data comprises generating the motion kernel at least in part before the first time using the motion data that was received at the second time.

Embodiment 5 is the method of any one of embodiments 1-4, further comprising:
   generating a predicted measure of quality of an object of a particular type depicted in the deblurred image by processing the deblurred image using a first machine learning model that has been trained to receive an input image and generate a predicted measure quality of an object of the particular type depicted in the input image;
   determining, using the predicted measure of quality of the object of the particular type depicted in the deblurred image, whether to approve the object.

Embodiment 6 is the method of any one of embodiments 1-5, further comprising:
   extracting one or more features from the deblurred image using a second machine learning model that has been trained to perform operations comprising receiving an input image and generating a location in the input image of one or more features; and generating a three-dimensional image of an environment of the robot using the deblurred image and the extracted features.

Embodiment 7 is the method of any one of embodiments 1-6, wherein generating a deblurred image by processing the image using the motion kernel comprises deconvolving the image using the motion kernel, comprising computing the Fourier Transform of the image and the Fourier Transform of the motion kernel.

Embodiment 8 is the method of any one of embodiments 1-7, wherein capturing the image occurs within real-time constraints of a robotic control system of the robot.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A computer-implemented method comprising:
receiving, at a first time, data representing a robotic control plan for a robot, wherein the robotic control plan comprises a plan for movement of the robot at a second time that is after the first time;
generating a pre-computed motion kernel using at least the received data representing the robotic control plan;
capturing, after generating the pre-computed motion kernel and using a camera that is attached to the robot, an image at the second time, wherein the image exhibits motion blur, and wherein the exhibited blur was caused by the movement of the robot at the second time; and
generating a deblurred image by processing the image according to the pre-computed motion kernel.

2. The method of claim 1, wherein the camera is attached to an arm of the robot, and the plan for the movement of the robot at the second time identifies a respective angle and angular velocity for each of a plurality of degrees of freedom of the arm of the robot.

3. The method of claim 1, wherein generating a pre-computed motion kernel using at least the received data representing the robotic control plan comprises generating, according to the plan for the movement of the robot at the second time included in the robotic control plan, data representing a trajectory of the camera in a Cartesian coordinate space, wherein:
the trajectory of the camera comprises a respective position and respective velocity for each of a plurality of degrees of freedom of the camera, and
the plurality of degrees of freedom of the camera comprises three degrees of freedom for a position of the camera in the Cartesian coordinate system and three degrees of freedom for a rotation of the camera in the Cartesian coordinate system.

4. The method of claim 1, further comprising:
generating a predicted measure of quality of a particular object that is depicted in the deblurred image and that has been produced in an environment of the robot, comprising processing the deblurred image using a machine learning model that has been trained to receive an input image and generate a predicted measure of quality of an object depicted in the input image;
determining, using the predicted measure of quality of the particular object that is depicted in the deblurred image and that has been produced in the environment of the robot, whether to approve the particular object.

5. The method of claim 1, wherein the deblurred image is a first deblurred image, and wherein the method further comprises:
receiving one or more second deblurred images depicting a same environment as the first deblurred image;
for each deblurred image of the first and second deblurred images:
identifying, for each feature in a set of features of the first and second deblurred images, a location of the feature in the deblurred image, comprising processing the deblurred image using a machine learning model that has been trained to perform operations comprising receiving an input image and identifying respective locations in the input image of one or more features; and
generating a three-dimensional image of the environment using the respective identified locations of the set of features in the first and second deblurred images.

6. The method of claim 1, wherein generating a deblurred image by processing the image according to the pre-computed motion kernel comprises deconvolving the image using the pre-computed motion kernel, comprising computing a Fourier Transform of the image and a Fourier Transform of the pre-computed motion kernel.

7. The method of claim 1, wherein capturing the image at the second time occurs within real-time constraints of a robotic control system of the robot, the real-time constraints identifying a set of actions that must be executed at each control cycle of a plurality of control cycles of the robotic control system.

8. The method of claim 1, further comprising generating, using the deblurred image, an updated robotic control plan that comprises a plan for movement of the robot at a third time that is after the second time.

9. The method of claim 8, wherein generating, using the deblurred image, the updated robotic control plan comprises:
identifying, using the deblurred image, a location of an object that is in an environment of the robot and that is depicted in the deblurred image; and
generating the plan for the movement of the robot at the third time such that the movement of the robot at the third time does not cause the robot to collide with the object.

10. The method of claim 1, wherein generating the deblurred image by processing the image according to the pre-computed motion kernel comprises:
receiving, at a third time that is after the second time, motion data characterizing the movement of the robot at the second time, the motion data having been generated from messages sent from the robot to a robotic control system of the robot during the movement of the robot at the second time;
updating the pre-computed motion kernel using the received motion data to generate an updated motion kernel; and
generating the deblurred image by processing the image using the updated motion kernel.

11. A system comprising one or more computers and one or more storage devices storing instructions that are operable, when executed by the one or more computers, to cause the one or more computers to perform a method comprising:
receiving, at a first time, data representing a robotic control plan for a robot, wherein the robotic control plan comprises a plan for movement of the robot at a second time that is after the first time;
generating a pre-computed motion kernel using at least the received data representing the robotic control plan;
capturing, after generating the pre-computed motion kernel and using a camera that is attached to the robot, an image at the second time, wherein the image exhibits motion blur, and wherein the exhibited blur was caused by the movement of the robot at the second time; and
generating a deblurred image by processing the image according to the pre-computed motion kernel.

12. The system of claim 11, wherein the camera is attached to an arm of the robot, and the plan for the movement of the robot at the second time identifies a respective angle and angular velocity for each of a plurality of degrees of freedom of the arm of the robot.

13. The system of claim 11, wherein generating a pre-computed motion kernel using at least the received data representing the robotic control plan comprises generating, according to the plan for the movement of the robot at the second time included in the robotic control plan, data representing a trajectory of the camera in a Cartesian coordinate space, wherein:
the trajectory of the camera comprises a respective position and respective velocity for each of a plurality of degrees of freedom of the camera, and
the plurality of degrees of freedom of the camera comprises three degrees of freedom for a position of the camera in the Cartesian coordinate system and three degrees of freedom for a rotation of the camera in the Cartesian coordinate system.

14. The system of claim 11, wherein generating a deblurred image by processing the image according to the pre-computed motion kernel comprises deconvolving the image using the pre-computed motion kernel, comprising computing a Fourier Transform of the image and a Fourier Transform of the pre-computed motion kernel.

15. The system of claim 11, wherein capturing the image at the second time occurs within real-time constraints of a robotic control system of the robot, the real-time constraints identifying a set of actions that must be executed at each control cycle of a plurality of control cycles of the robotic control system.

16. One or more non-transitory computer storage media encoded with computer program instructions that when executed by a plurality of computers cause the plurality of computers to perform operations comprising:
receiving, at a first time, data representing a robotic control plan for a robot, wherein the robotic control plan comprises a plan for movement of the robot at a second time that is after the first time;
generating a pre-computed motion kernel using at least the received data representing the robotic control plan;
capturing, after generating the pre-computed motion kernel and using a camera that is attached to the robot, an image at the second time, wherein the image exhibits motion blur, and wherein the exhibited blur was caused by the movement of the robot at the second time; and
generating a deblurred image by processing the image according to the pre-computed motion kernel.

17. The non-transitory computer storage media of claim 16, wherein the camera is attached to an arm of the robot, and the plan for the movement of the robot at the second time identifies a respective angle and angular velocity for each of a plurality of degrees of freedom of the arm of the robot.

18. The non-transitory computer storage media of claim 16, wherein generating a pre-computed motion kernel using at least the received data representing the robotic control plan comprises generating, according to the plan for the movement of the robot at the second time included in the robotic control plan, data representing a trajectory of the camera in a Cartesian coordinate space, wherein:
the trajectory of the camera comprises a respective position and respective velocity for each of a plurality of degrees of freedom of the camera, and
the plurality of degrees of freedom of the camera comprises three degrees of freedom for a position of the camera in the Cartesian coordinate system and three degrees of freedom for a rotation of the camera in the Cartesian coordinate system.

19. The non-transitory computer storage media of claim 16, wherein generating a deblurred image by processing the image according to the pre-computed motion kernel comprises deconvolving the image using the pre-computed motion kernel, comprising computing a Fourier Transform of the image and a Fourier Transform of the pre-computed motion kernel.

20. The non-transitory computer storage media of claim 16, wherein capturing the image at the second time occurs within real-time constraints of a robotic control system of the robot, the real-time constraints identifying a set of actions that must be executed at each control cycle of a plurality of control cycles of the robotic control system.

* * * * *